(12) United States Patent
Lykkja et al.

(10) Patent No.: US 9,840,231 B2
(45) Date of Patent: Dec. 12, 2017

(54) TAMPER DETECTION (71) Applicant: Q-Free ASA, Trondheim (NO)

(72) Inventors: Ola Martin Lykkja, Rasta (NO);
Anders Ivar Hagen, Hommelvik (NO)

(73) Assignee: Q-Free ASA, Trondheim (NO)

( * ) Notice: Subject to any disclaimer, the term of this patent is extended or adjusted under 35 U.S.C. 154(b) by 0 days.

(21) Appl. No.: 15/245,084

(22) Filed: Aug. 23, 2016

(65) Prior Publication Data

US 2017/0057462 A1   Mar. 2, 2017

(30) Foreign Application Priority Data

Aug. 24, 2015   (GB) .................................. 1514987.5

(51) Int. Cl.
*B60R 25/34* (2013.01)
*G08B 21/02* (2006.01)
*G08B 13/14* (2006.01)

(52) U.S. Cl.
CPC .......... *B60R 25/34* (2013.01); *G08B 13/1463* (2013.01); *G08B 21/0205* (2013.01); *B60R 2325/101* (2013.01)

(58) Field of Classification Search
CPC ......... B60R 25/34; B60R 25/10; B60R 25/32; B60R 25/00; B60R 25/24; B60R 13/10; B60R 2325/101; B60R 2325/105; G08B 13/1463; G08B 13/24; G08B 21/0205
See application file for complete search history.

(56) References Cited

U.S. PATENT DOCUMENTS

| | | |
|---|---|---|
| 6,448,889 B1 | 9/2002 | Hudson |
| 2002/0021210 A1 | 2/2002 | Naddeo |
| 2004/0189493 A1 | 9/2004 | Estus et al. |
| 2014/0022066 A1 | 1/2014 | Richardson |
| 2014/0090280 A1 | 4/2014 | Cunningham |

FOREIGN PATENT DOCUMENTS

| | | |
|---|---|---|
| BE | 1018331 | 9/2010 |
| CN | 201122338 Y | 9/2008 |
| CN | 202608694 | 12/2012 |
| CN | 202716851 | 2/2013 |
| CN | 202987068 | 6/2013 |
| CN | 203438981 U | 2/2014 |
| DE | 200 12 564 U1 | 12/2001 |

(Continued)

OTHER PUBLICATIONS

Combined Search and Examination Report Under Sections 17 and 18(3) for GB Patent Application No. GB1514987.5 dated Dec. 13, 2016.

*Primary Examiner* — Leon Flores
(74) *Attorney, Agent, or Firm* — McDonnell Boehnen Hulbert & Berghoff LLP (57) ABSTRACT

A vehicle (18) having a license plate tamper detection system comprising: a first sensor (4) arranged to provide monitor data corresponding to presence of a first license plate (20) on the vehicle; and a second sensor (6) arranged to provide reference data. The license plate tamper detection system is arranged to compare the monitor data with the reference data and generate a tampering event if the comparison yields more than a predetermined difference between the monitor data and the reference data.

16 Claims, 8 Drawing Sheets

(56) References Cited

FOREIGN PATENT DOCUMENTS

| | | | |
|---|---|---|---|
| EP | 0648653 | 4/1995 | |
| EP | 1437270 A1 * | 7/2004 | ............ B60R 25/00 |
| EP | 2530656 | 12/2012 | |
| GB | 2429828 A | 3/2007 | |
| GB | 2453598 A | 4/2009 | |
| IN | 2049/CHE/2010 | 2/2013 | |
| JP | 2001-354084 A | 12/2001 | |
| WO | 1996/036030 | 11/1996 | |
| WO | 1999/019170 | 4/1999 | |
| WO | 2008/020771 | 2/2008 | |
| WO | 2008/130734 | 10/2008 | |
| WO | 2009/054648 | 4/2009 | |
| WO | 2010/051980 | 5/2010 | |
| WO | 2014/055405 | 4/2014 | |

* cited by examiner

TAMPER DETECTION

CROSS REFERENCE TO RELATED APPLICATIONS

This application claims priority to Great Britain Patent App. No. 1514987.5, filed Aug. 24, 2015, the contents of which are fully incorporated by reference herein for all purposes.

BACKGROUND

All around the world, motor vehicles are fitted with license plates (sometimes referred to as registration plates or number plates) to identify them for official purposes. Each license plate comprises an identifier (numeric or alphanumeric) unique to the issuing region that can be used to permit easy identification of the vehicle and by extension details surrounding the vehicle such as its history and its owner. In some countries the license plate identifiers are unique nationally, while in others the identifiers are unique to a particular state or province.

Unfortunately, due to their uniquely identifying nature, the ability to able to steal or tamper with (i.e. remove or attempt to remove) license plates is particularly attractive to criminals. Examples of crimes relating to license plate tampering include masking the identity of stolen vehicles, fleeing from fuel stations without paying and evading parking tickets, speeding fines, congestion charges or tolls.

There have been a number of solutions proposed in the past to try and counter license plate related crimes. A common approach is to use tamper proof screws (sometimes referred to as "security screws") to try to make it difficult to remove license plates from a vehicle. However, these are easily overcome and therefore of limited effectiveness.

BRIEF DESCRIPTION OF THE FIGURES

Embodiments will now be described, by way of example only, with reference to the accompanying drawings in which.

DETAILED DESCRIPTION

When viewed from a first aspect, a vehicle is provided having a license plate tamper detection system comprising:

a first sensor arranged to provide monitor data corresponding to presence of a first license plate on the vehicle; and a second sensor arranged to provide reference data, wherein the license plate tamper detection system is arranged to compare said monitor data with said reference data and generate a tampering event if said comparison yields more than a predetermined difference between the monitor data and the reference data.

Another aspect relates to a license plate tamper detection system for installation on a vehicle, the system comprising:

a first sensor for providing monitor data corresponding to presence of a first license plate when installed on said vehicle; and a second sensor for providing reference data when installed on said vehicle, wherein the license plate tamper detection system is arranged to compare said monitor data with said reference data and generate a tampering event if there is more than a predetermined difference between the monitor data and the reference data.

Thus it will be seen by those skilled in the art that the herein-described embodiments may provide a way of detecting attempts to tamper with the license plate(s) on a vehicle by comparing data from one sensor associated with the license plate with reference data. If an attempt should be made to tamper with a license plate this is likely to be experienced in a different manner by the first and second sensors, and so by comparing data from each of the devices it is possible to determine if one has undergone a change that the other has not, which may be indicative of a tampering attempt. On the other hand more general factors such as temperature, noise, vibration etc. are likely to be experienced similarly by both sensors and so do not trigger a tamper event.

While in most countries worldwide a license plate is required on both the front and rear of a vehicle, in others only one or the other is required. In fact in the United States, while the majority of states require front and rear license plates, a significant number only require a rear license plate. The first license plate—the presence of which is associated with the monitor data provided by the first sensor—could be therefore be e.g. a front or rear plate.

Where the vehicle has only one license plate the second sensor may be mounted at any convenient location on the vehicle, away from the license plate such as within the boot (or trunk) or under the bonnet (or hood).

Where the vehicle has two license plates (or more) it could be decided only to monitor one but more desirably both are monitored. In a set of embodiments a third sensor is arranged to provide second monitor data corresponding to presence of a second license plate on the vehicle. The system could be arranged to compare the second monitor data with the reference data and generate a tampering event if such comparison yields more than a predetermined difference between the second monitor data and the reference data. Alternatively a fourth sensor could be provided to provide second reference data for this purpose.

In a preferred set of embodiments however the second sensor is arranged to provide second monitor data corresponding to presence of a second license plate on the vehicle. In other words the reference data is itself monitor data for a second license plate. This may provide a symmetrical arrangement in which monitor data from each sensor is compared to the other.

While there are a number of possible locations where the sensor(s) providing monitor data corresponding to the presence of a license plate could be located, e.g. behind the respective license plate on the vehicle, in a set of embodiments at least the first sensor, and optionally the second sensor, is embedded in or otherwise attached to the corresponding license plate.

In a set of such embodiments, the tamper detection system is arranged to provide information about the distance between the first and second sensors. In such embodiments, the distance between the first and second sensors should remain constant unless one of the sensors is moved, which would indicate that an attempt to tamper with the license plate in which it is embedded or attached to has occurred.

There are a number of types of sensors that could be used to detect an attempt to tamper with the license plate(s). In a set of embodiments, the first and/or second sensors implement at least one sensor technology from the following group: radar; ultrawideband radar; optical; magnetic; acoustic; pressure; accelerometers; gyroscopes.

The first and second sensors could communicate with an intermediate unit that would perform the necessary comparisons and make decisions as to whether or not to generate a tamper event. In a set of embodiments however, the sensors are provided with local interface electronics to form sensor units which communicate directly with one another. This advantageous arrangement allows the two devices to collaborate by sharing their respective data and making the relevant decisions without the need for additional processing hardware. In a particular set of embodiments, the communication between sensor units is wireless. By using wireless technology to implement sensor unit-to-sensor unit communications, the complexity of installation is reduced, making retrofitting the system to older vehicles relatively straightforward. In a set of embodiments, the communication implements at least one protocol from the following group: WiFi; ZigBee; Bluetooth®; Bluetooth® Smart (formerly known as Bluetooth® Low Energy); and ultra-wideband.

The Applicant has appreciated that a particularly convenient arrangement can be achieved by providing sensors which are incorporated in license plates which can communicate with one another without requiring any additional hardware to be installed on the vehicle and so can be easily retro-fitted to existing vehicles. In a second aspect, a license plate tamper detection system is provided that has a first license plate comprising a first sensor arranged to provide first monitor data; and a second license plate comprising a second sensor arranged to provide second monitor data, wherein the first and second license plates are arranged to:
  exchange said first and second monitor data;
  compare said first and second monitor data; and
  generate a tampering event if more than a predetermined difference between the first monitor data and the second monitor data.

It will be appreciated by those skilled in the art that when the license plates can thus form a standalone tamper detection system. Such license plates can be retrofitted to existing vehicles with relative ease, as well as being suited to installation on new vehicles. For example, in embodiments powered by a battery, the license plates will not require integration into the electrical power system of the vehicle.

In either aspect, the first and second sensor units or the first and second license plates may be arranged such that one is a master while the other is a slave. This could mean that one is configured to carry out the processing to compare the first monitor data with the second monitor data. In another set of embodiments the first and second sensor units or license plates are configured in the same way.

Particular embodiments include ultra-wideband radar for both sensing presence of a license plate and communication between license plates or sensor units. Advantageously the sensor and communications share ultra-wideband hardware, thus reducing the bill of materials for each such system.

A tampering event is generated if the (first) monitor data differs from the reference or second monitor data by a predetermined amount. The predetermined amount could be zero—i.e. as soon as the data from the first and second sensors do not correspond a tamper event may be triggered. However, in a set of embodiments it is non-zero. This advantageous arrangement permits slight variations that are deemed to be "normal", reducing the likelihood of the system reporting false positive tampering events.

The tampering events generated by the tamper detection system could be reported in real time. However, in a set of embodiments, the system comprises a memory arranged to store tampering events in an event log. In a further set of embodiments, the memory comprises non-volatile memory. In such embodiments, the system keeps track of any such tampering events such that the log can be queried at a later time as required.

The log could be checked manually, for example by connecting an external device such as a laptop computer to the system and downloading the event log. However, in a set of embodiments, the system further comprises a communications system arranged to transmit data from said memory. The communications system advantageously allows the tamper detection system to communicate the log to external devices either automatically or upon request.

In a set of embodiments, the communications system is arranged to communicate with an enforcement device and provide tampering events from the event log to the enforcement device. In such embodiments, a law enforcement agency such as the police may be provided with an enforcement device such as a handheld terminal that is arranged to communicate with the tamper detection system via its communication system in order to establish whether any tampering events have occurred.

While it is useful for law enforcement to be able to interrogate the event log manually using such a device as explained with reference to some of the embodiments outlined above, in an overlapping set of embodiments, the communications system may arranged to communicate with an automatic interrogation system and provide vehicle registration information to the automatic interrogation system. In such embodiments, the communications system communicates with the automatic interrogation system which may comprise, by way of example only, an overhead gantry located above a motorway carriage or a roadside terminal located beside a tolling station. Such automatic interrogation systems may therefore be arranged to query the event log for each vehicle that passes it. These automatic interrogation systems may be installed in strategic locations as desired, or may include systems that are already in situ that are capable of being retrofitted with the ability to interrogate the event log.

In a set of embodiments, the communications system is arranged to implement dedicated short-range communications (DSRC).

The tamper detection system may also be arranged to provide additional information via the communications system. By way of example only, the system may be arranged to communicate information relating to the license plate number, vehicle identification number (VIN), brand, model, colour, weight, size, etc.

Those skilled in the art will appreciate that a number of wireless protocols exist that would be appropriate for the communications system outlined in some embodiments described herein. In a set of embodiments, the communications system implements at least one protocol from the following group: WiFi; ZigBee®; Bluetooth®; Bluetooth® Smart; and ultra-wideband radar. Such protocols are widely adopted, thus making integration with existing hardware more feasible.

While the system could be controlled externally, in a set of embodiments the system comprises a microcontroller. Such embodiments allow the system to operate autonomously, performing all of the necessary comparisons and deciding whether a tampering attempt has occurred. The microcontroller may also be arranged to store tamper events with the event log and operate the communications system in embodiments including such features.

The tamper detection system could be powered via the vehicle's own power systems, such as via the 12 V or 24 V systems ubiquitous within the automotive industry. However, this means that the system would be draining the vehicle's battery (or batteries in the case of larger trucks) which are required for starting the vehicle. In an advantageous set of embodiments, the system comprises an internal battery. The internal battery ensures that the tamper detection system cannot be disabled by simply cutting the external power, and allows the system to continue detecting attempts to tamper with the license plate(s) even when the vehicle is not being operated. Other sources of power such as photo-voltaic cells etc. are also possible.

While the various communication links (such as those between the first and second sensor units, first and second license plates or between the tamper detection system and any remote enforcement system) may be open. In another set of embodiments however at least some of them are encrypted. Accordingly, the system may comprise an encryption module. The encryption module may be used to increase the security of communications carried out by the tamper detection system using cryptographic methods. Cryptography can be used to ensure that information exchanged via the communication links is confidential (i.e. the information is accessible only to intended recipients), maintains its integrity (i.e. the information is not altered in any manner), authenticated (i.e. the origin of the information is known with confidence), and non-repudiable (i.e. the originator of the information cannot deny that it was the originator). The encryption module may employ a number of different cryptographic functions known in the art per se, but may for example include block ciphers, stream ciphers, hash functions, digital signatures and random number generators.

Depending on the type of sensor in use, motion of the vehicle may cause false positive tamper events. In a set of embodiments, the system is arranged to assess whether the vehicle is stationary. While this assessment could be used to inform decision made about tampering, in a set of embodiments, the sensors are disabled if the vehicle is not stationary. Given that tampering with the license plate is highly unlikely while the vehicle is in motion, disabling the system in such circumstances is of little concern to the security of the license plates.

In some embodiments, the first and second sensors comprise accelerometers. The Applicant has appreciated that by comparing the acceleration experienced by the first license plate with that of the second license plate, any attempt to tamper with either of the plates can be successfully detected.

Figure 1:
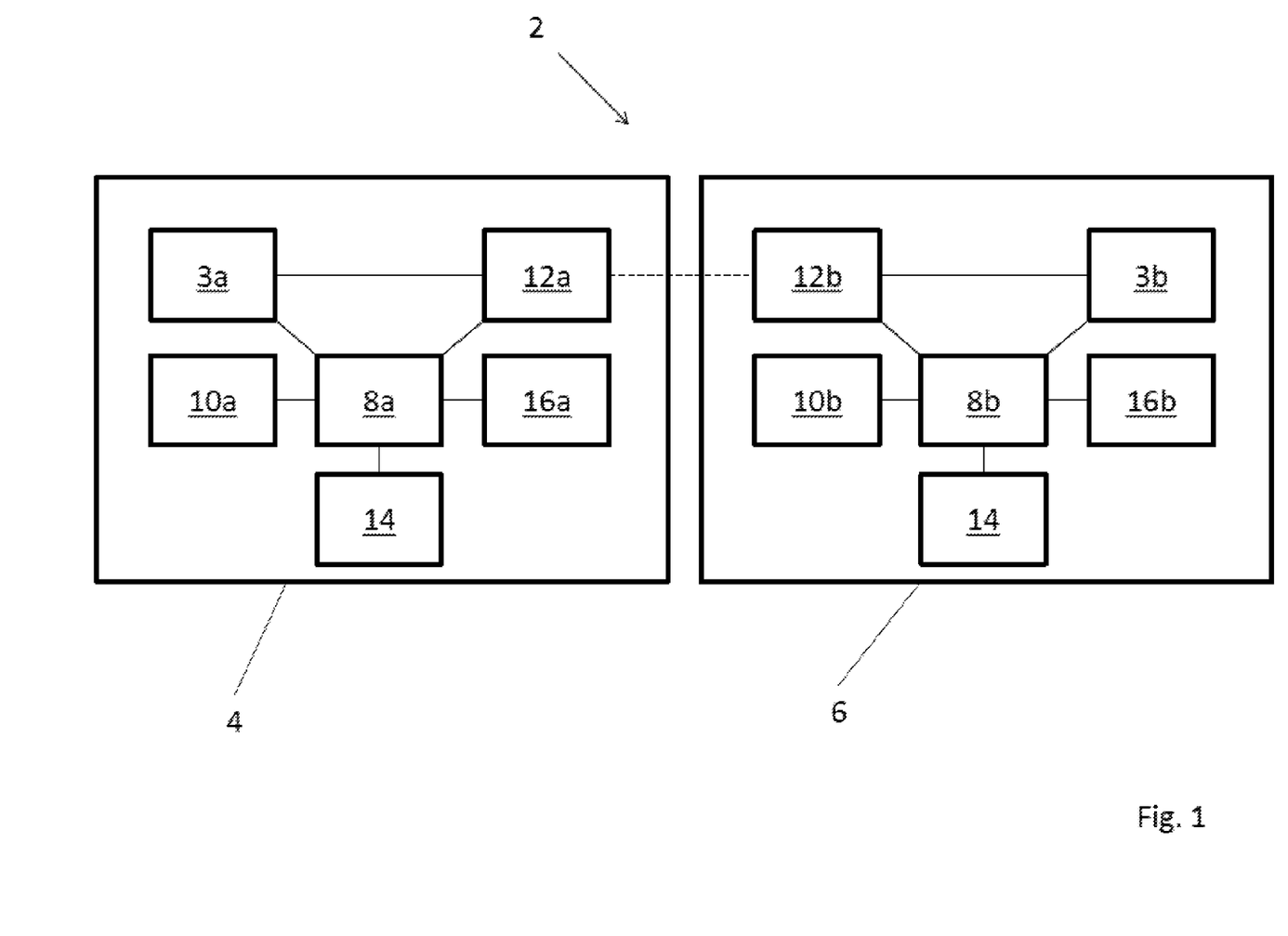
FIG. 1 is a block diagram of a tamper detection system in accordance with an embodiment of the present disclosure.

FIG. 1 is a block diagram of a tamper detection system 2 which includes two sensor units 4, 6. Each of the sensor units 4, 6 comprises a sensor 3a, 3b respectively. Each sensor unit 4, 6 also comprises a microcontroller 8a, 8b; non-volatile memory 10a, 10b; a communication system 12a, 12b; and are powered by a battery 16a, 16b. The sensor units 3a, 3b are each connected to an enforcement communication system 14. While in this example each sensor unit 4, 6 has its own battery 16a, 16b, other arrangements may utilise a single battery that powers the whole system 2.

While in this exemplary embodiment there is a single enforcement communication system 14 to which both sensor units 4, 6 are connected, other exemplary configurations have a separate enforcement communication system for each sensor unit 4, 6 or a single enforcement communication system within only one of the sensor units.

Figure 2:
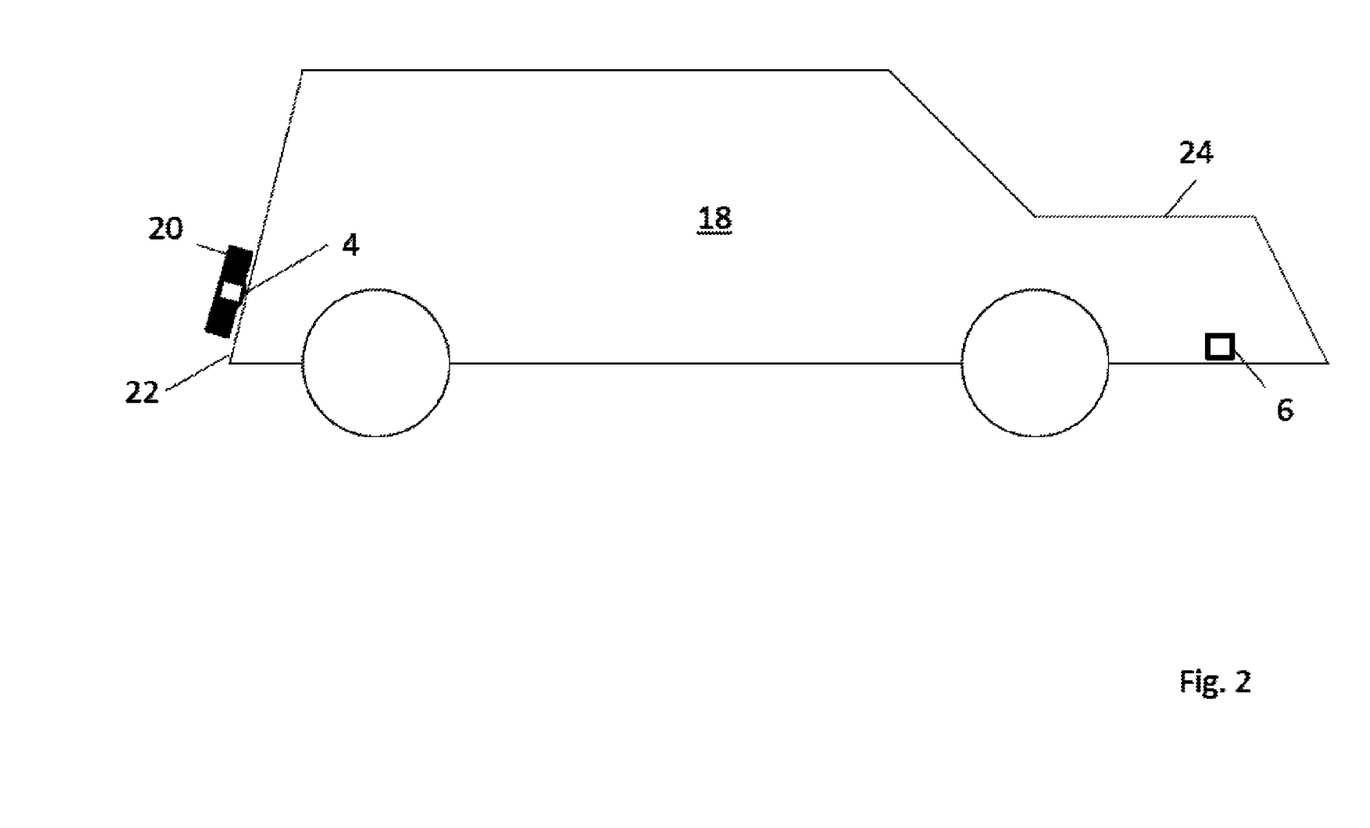
FIG. 2 shows the placement of two sensors on a vehicle within an embodiment incorporating the tamper detection system of FIG. 1.

FIG. 2 shows schematically the approximate placement of two sensor units 4, 6 on a vehicle 18. In this particular embodiment, the first sensor unit 4 is embedded in a license plate 20 affixed to the rear bumper 22 of the vehicle 18 (as described further with reference to FIGS. 3A and 3B) while the second sensor 6 is mounted under the bonnet 24.

In such an embodiment, the tamper detection system 2 is concerned only with attempts to remove the rear (and in this case only) license plate 20 from the vehicle 18. As such, the second sensor unit 6 provides reference data—i.e. a baseline to which data from the first sensor unit 4 can be compared.

Figures 3A, 3B:
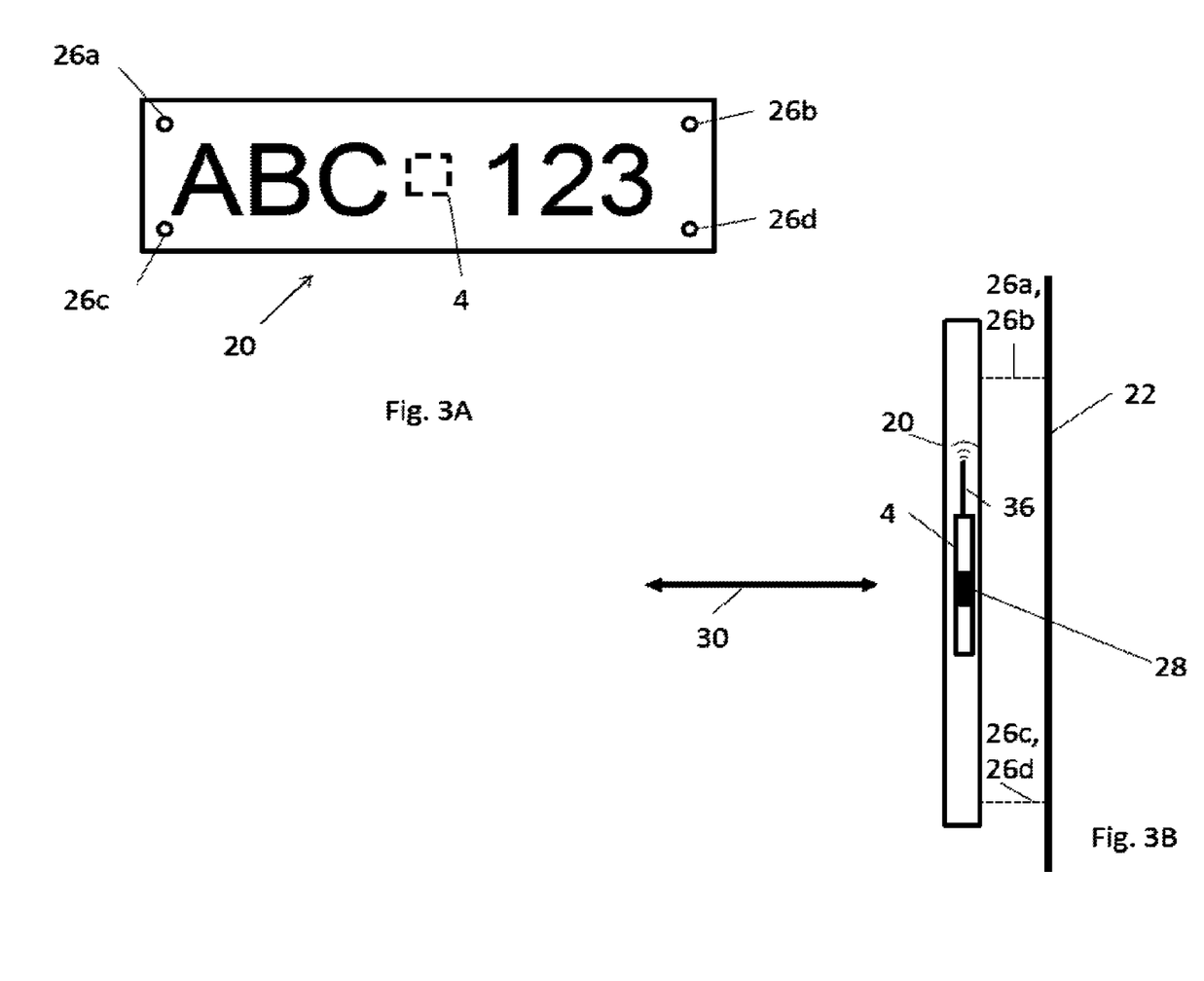
FIGS. 3A and 3B show a sensor embedded within a license plate within the tamper detection system of FIG. 1.

FIGS. 3A and 3B show the sensor unit 4 embedded in the license plate 20. FIG. 3A depicts a front view of a license plate 20, and shows the relative placement of the sensor unit 4 (depicted as a dashed line) in the license plate 20, although of course the sensor unit 4 could be placed in any convenient part of the license plate 20. The license plate 20 is securely attached to the rear bumper 22 of the vehicle 18 by four screws 26a, 26b, 26c, 26d. These screws 26a, 26b, 26c, 26d are often arranged to make it difficult to remove the license plate 20, however this is not essential. The screws 26a, 26b, 26c, 26d may penetrate the license plate 20 itself or may affix a frame (not shown) to the rear bumper 22 into which the license plate 20 is inserted according to national standards.

FIG. 3B shows a side view of the sensor unit 4 mounted embedded in the license plate 20.

The sensor in the sensor unit 4 is an accelerometer 28. The accelerometer is typically sensitive along three sensing axes 30, although this is not essential and fewer axes may be adequate. A local microprocessor (not shown) calculates the acceleration experienced by the license plate 20 from the data provided by the accelerometer 28 in a manner known in the art per se. The sensor unit 4 also comprises one or more radio antennas 36, the purpose of which will be described later.

The sensor unit 6 located under the bonnet 24 operates in a similar way. Thus an accelerometer associated with the sensor unit 6 located under the bonnet 24 provides a reference measure of acceleration to which the acceleration data from the other sensor unit 4 may be compared.

The sensor units 4, 6 can share their respective acceleration data via the communication system 12 (shown functionally in FIG. 1). The communication system could use any appropriate wireless or wired communication method known in the art but in this particular example the communication system 12 uses Bluetooth® to communicate data between the sensor units 4, 6. The data might be streamed in real-time between the sensors 4, 6 or it may be sent periodically, either as batches of measured values or as a single time-averaged value.

The acceleration experienced by each sensor unit 4, 6 should normally remain relatively stable. If there are fluctuations in the measurements due to vehicle-wide movements (for example wind buffeting or a person leaning against the vehicle) or due to changes in temperature, etc., these will affect both sensor units 4, 6 equally and so a comparison between them will yield little difference. The comparison could be carried out by either one of the sensor units 4, 6 or by both.

If an attempt is made to remove the license plate 20, by force or by removing the screws 26*a*-*d*, this is likely to cause the license plate 20 to bend or move away from (or towards) the bumper 22 and the accelerometer 28 within sensor unit 4 will sense the resulting acceleration. The acceleration data from the first sensor unit 4 will change significantly compared to the acceleration data from the second sensor unit 6 which would not change and a tamper event is therefore generated. Again either or both of the sensor units 4, 6 could generate the tamper event and store it in an event log, kept on the non-volatile memory 10.

The content of the event log may be communicated to external devices by the enforcement communications system 14 (shown functionally in FIG. 1). This comprises the antenna(s) 36 which is/are part of one of the sensor units 4 and used by the enforcement communications system 14 to provide information to external devices (not shown) as will be described in greater detail below with reference to FIG. 6 via dedicated short-range communications (DSRC) or other communication protocol such as Bluetooth® or UWB.

Figure 4:
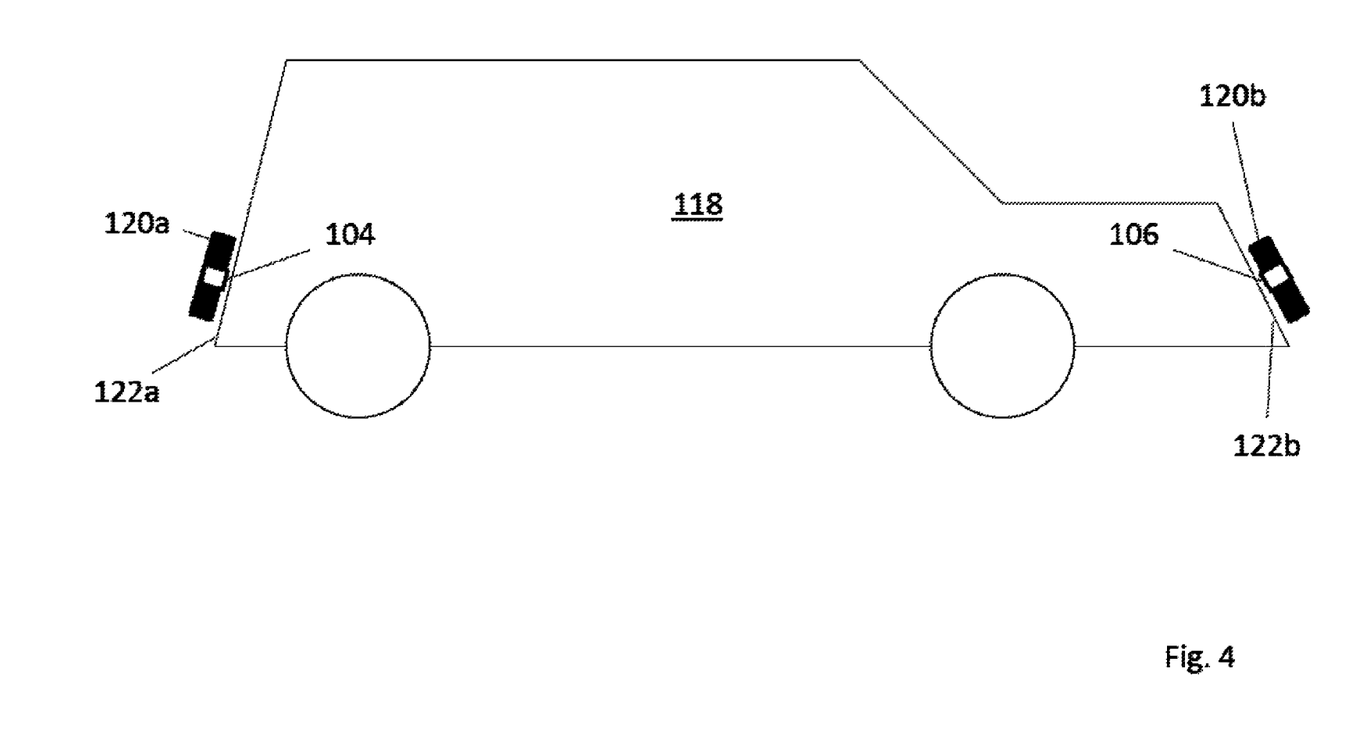
FIG. 4 shows the placement of two sensors on a vehicle within a further embodiment incorporating the tamper detection system of FIG. 1.

FIG. 4 depicts, schematically, an alternative embodiment with a different physical arrangement but the same functional components as shown in FIG. 1. In this embodiment, the vehicle 118 is provided with a rear license plate 120*a* attached to a rear bumper 122*a*, and a front license plate 120*b* attached to a front bumper 122*b*. Two sensor units 104, 106 are embedded within the respective license plates 102*a*, 120*b*. The system is therefore symmetric in that each sensor unit 104, 106 acts as reference for the other. The sensor units 104, 106 operate in the same way as in the first embodiment and cooperate to determine whether tampering with either license plate 120*a*, 120*b* is taking place. The two sensors 104, 106 share their respective acceleration data with one another via the communication system 12 as before. If there is significant disagreement (i.e. more than a de minimus threshold) between the acceleration data from the sensor units 104, 106 a tamper event is generated and stored in the event log as previously described.

Figure 5:
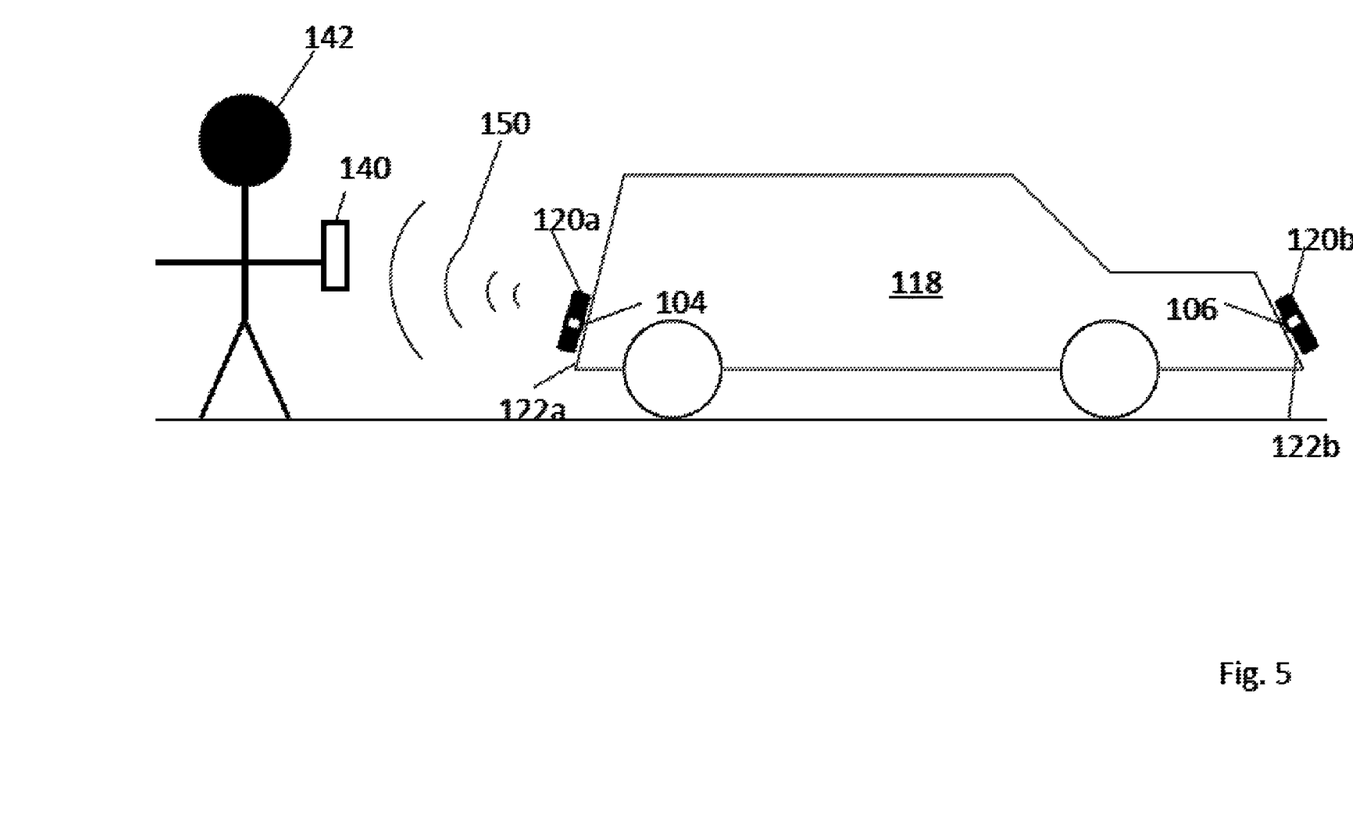
FIG. 5 shows the tamper detection system of FIG. 4 communicating with a handheld enforcement device.

FIG. 5 shows the tamper detection system 2 of FIG. 4 communicating with a handheld enforcement device 140, although the first embodiment may communicate in the same way. In this example, a police officer 142 has decided to perform a check on the vehicle 118 using a handheld enforcement device 140. The handheld enforcement device 140 uses DSRC 150 (e.g. using an equivalent of the antenna 36 as illustrated in FIG. 3B for transmission and reception) to interrogate the event log stored in the non-volatile memory 10 in order to determine whether any attempts to tamper with the license plates 120*a*, 120*b* have been made. The communications with the enforcement device 140 are encrypted to ensure that security and confidentiality are maintained.

Figure 6:
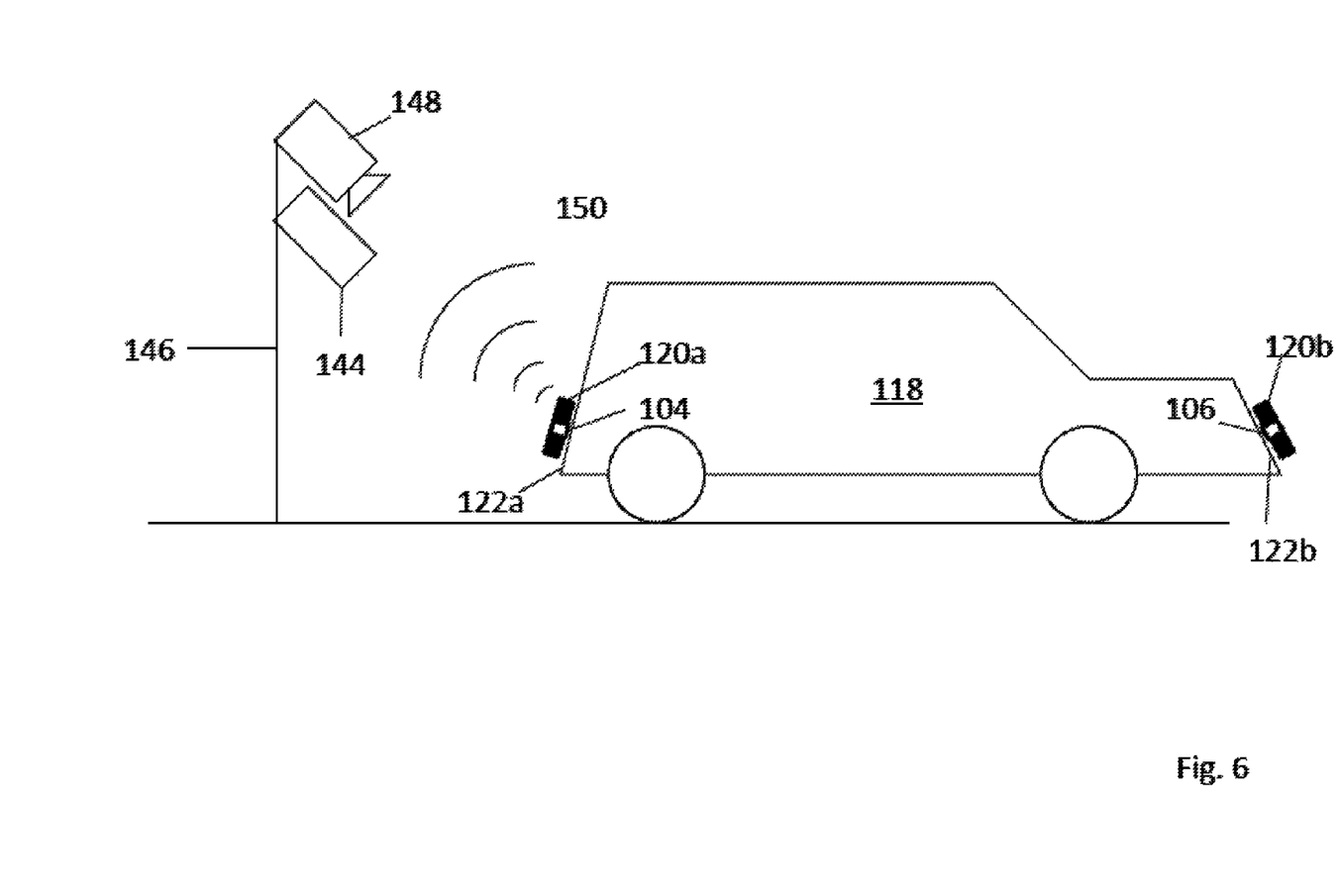
FIG. 6 shows the tamper detection system of FIG. 4 communicating with an automatic interrogation system.

FIG. 6 shows the tamper detection system 2 of FIG. 4 communicating with an automatic interrogation system 144. In this example, the vehicle 118 has driven past an overhead gantry 146 upon which the automatic interrogation system 144 is mounted. In this exemplary embodiment, the automatic interrogation device 140 again uses DSRC 150 to interrogate the event log stored in the non-volatile memory 10. The automatic interrogation device 144 may also include a camera 148, and optical character recognition (OCR) or other image processing techniques known in the art per se may be utilised to check whether the data from the enforcement communications system 14 matches the information displayed on the license plates 120*a*, 120*b*. Again communications with the automatic interrogation device 140 are encrypted.

Figures 7A, 7B:
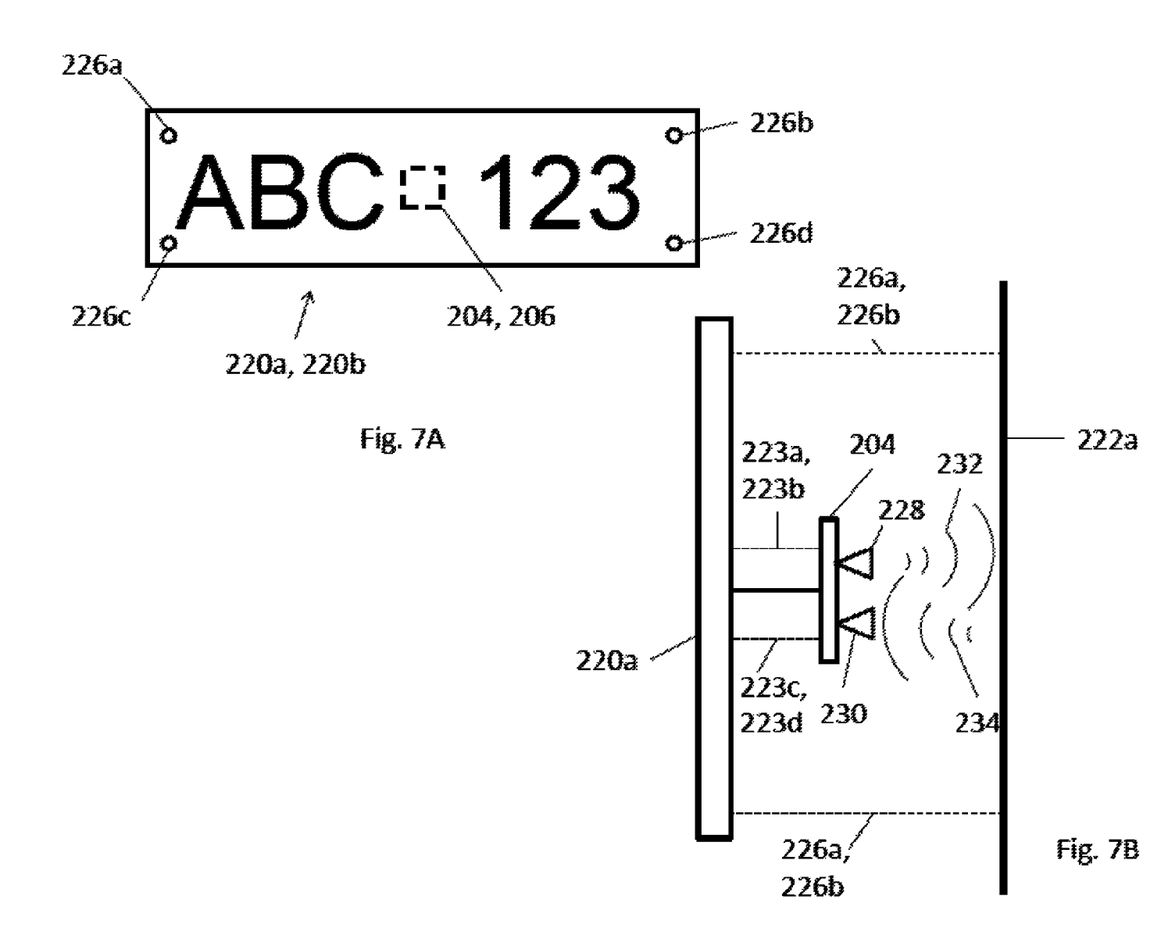
FIGS. 7A and 7B show a time-of-flight based sensor mounted behind a license plate within the tamper detection system of FIG. 1.

FIGS. 7A and 7B show sensor units 204, 206 behind respective license plates 220*a*, 220*b*. FIG. 7A depicts a front view of a license plate 220*a*, 220*b*, and shows the relative placement of the respective sensor unit 204, 206 (depicted as a dashed line) behind the corresponding license plate 220*a*, 220*b*. The sensor unit 204, 206 may form an integral part of the license plate or license plate housing. The license plate 220*a*, 220*b* is securely attached to a bumper 222*a*, 222*b* (front or rear) of the vehicle 218 by four screws 226*a*, 226*b*, 226*c*, 226*d*. These screws 226*a*, 226*b*, 226*c*, 226*d* are often arranged to make it difficult to remove the license plates 220*a*, 220*b*. The screws 226*a*, 226*b*, 226*c*, 226*d* may penetrate the license plate 220 itself or may affix a frame (not shown) to the bumpers 222*a*, 222*b* into which the license plates 220*a*, 220*b* are inserted according to national standards.

FIG. 7B shows a side view of a sensor unit 204 mounted behind a license plate 220*a*. The sensor unit 204 is mounted license plate 220*a* via four screws 223*a*, 223*b*, 223*c*, 223*d* and faces the rear bumper 222*a*. The other sensor unit 206 may be mounted behind another license plate 220*b* facing a front bumper 222*b* in a similar manner.

The sensor unit 204 comprises an ultra-wideband (UWB) radio transmitter 228 and a UWB radio receiver 230. The UWB transmitter 228 transmits short, broad spectrum pulses 232 that are then reflected by the surface of the rear bumper 222*a*. The reflected pulses 234 are then received by the UWB receiver 230. A local microprocessor (not shown) calculates the time of flight (TOF) by comparing the time between transmission and reception which then provides an indication of the distance to the rear bumper 222*a*.

The sensor units 204, 206 can share the TOF data accumulated for their respective pulses via the communication system 212 (shown functionally in FIG. 1). The communication system could actually use the UWB transmitters 228 and receivers 230 with suitably encoded transmissions. Alternatively another wireless or wired channel could be used. The data might be streamed in real-time between the sensors 204, 206 or it may be sent periodically, either as batches of measured values or as a single time-averaged value.

The TOF calculations by each sensor unit 204, 206 should normally remain relatively stable. If there are fluctuations in the measurements due to changes in temperature, etc., these will affect both sensor units 204, 206 equally and so a comparison between them will yield little difference. The comparison could be carried out by either one of the sensor units 204, 206 or by both.

If an attempt is made to remove a license plate 220*a*, 220*b*, by force or by removing the screws 226*a*-*d*, this is likely to cause the license plate 220*a*, 220*b* to bend or move away from (or towards) the respective bumper 222*a*, 222*b*, increasing (or decreasing) the time between transmission and reception. The TOF data from the first sensor unit 204 will change significantly compared to the TOF data from the second sensor unit 206 which would not change and a tamper event is therefore generated. Again either or both of the sensor units 204, 206 could generate the tamper event and store it in an event log, kept on the non-volatile memory 210.

The UWB transmitters 228 and receivers 230 may also form part of the enforcement communications system as described previously, and thus can used for communicating the event log to external devices.

Figure 8:
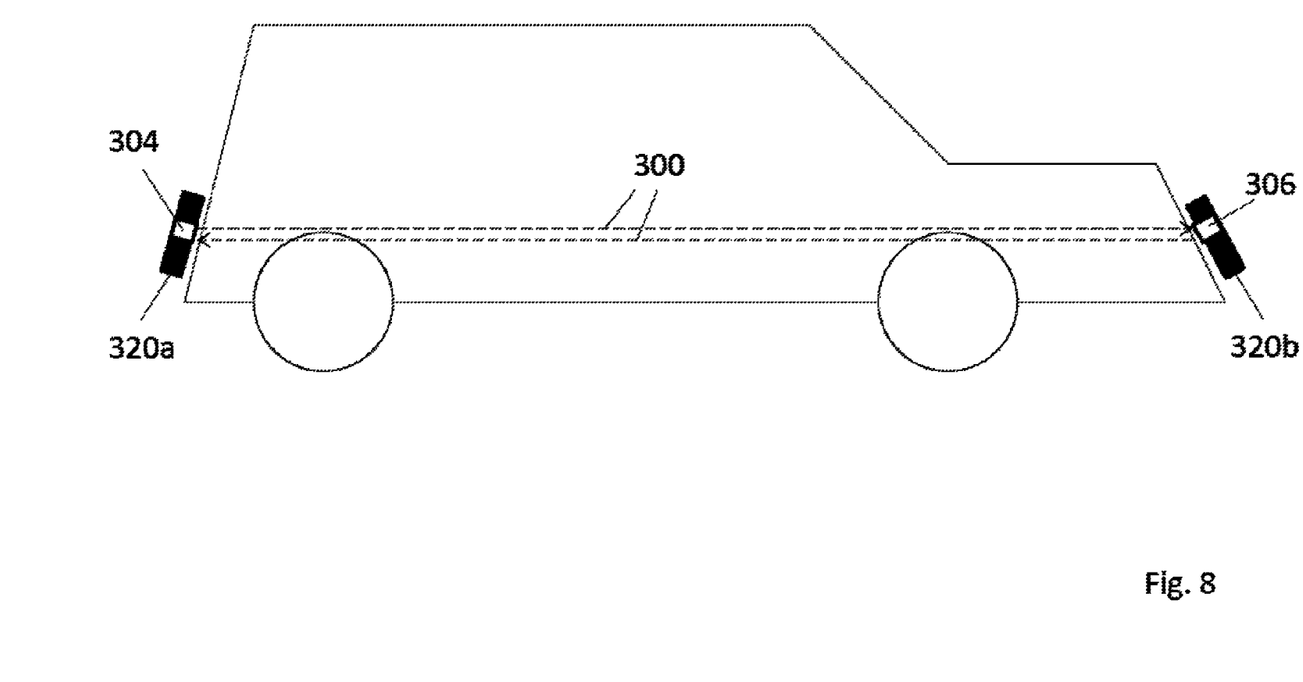
FIG. 8 shows time-of-flight based sensors embedded within two license plates within the tamper detection system of FIG. 1.

FIG. 8 shows time-of-flight based sensors embedded within two license plates as part of a tamper detection system 2. In this example two sensor units 304, 306 are embedded within rear and front license plates 320a, 320b respectively. Each of the sensor units 304, 306 comprise UWB transmitters and receivers (not shown) as described with reference to FIGS. 7A and 7B.

In this particular embodiment, the sensor units 304, 306 are each arranged to calculate TOF data relating to the round trip of UWB signals 300 therebetween. If either or both of the license plates 320a, 320b are moved, the distance between them will change, and thus a tampering attempt may be detected. In some configurations only one of the sensor units 304, 306 might calculate the TOF data, but by having both units 304, 306 carry out the calculations, comparisons can be made by either or both of the units 304, 306 to ensure they are in agreement, increasing the reliability of the system.

Thus it will be seen that a license plate tamper detection system that compares data from a license plate sensor to data from a further sensor which may be located on an additional license plate or elsewhere on a vehicle has been described herein. Although particular embodiments have been described in detail, it will be appreciated by those skilled in the art that many variations and modifications are possible using the principles set out herein. For example, tamper detection systems incorporating other forms of sensors such as gyroscopes, magnetic sensors, optical sensors, ultrasonic sensors, etc. are to be understood as being within the scope of the instant disclosure.

Although the embodiments described have the sensor units communicating directly with one another they could instead communicate with a further control unit which may be a dedicated control unit or part of the vehicle's management system.

What is claimed is:

1. A license plate tamper detection system having a first license plate comprising a first sensor arranged to provide first monitor data; and a second license plate comprising a second sensor arranged to provide second monitor data, wherein the first and second license plates are arranged to:
    exchange said first and second monitor data;
    compare said first and second monitor data; and
    generate a tampering event when more than a predetermined difference between the first monitor data and the second monitor data.

2. The license plate tamper detection system as claimed in claim 1, arranged to use ultra-wideband radar for communication between said license plates.

3. The license plate tamper detection system as claimed in claim 1, comprising a memory arranged to store tampering events in an event log.

4. The license plate tamper detection system as claimed in claim 3, further comprising a communications system arranged to transmit data from said memory.

5. The license plate tamper detection system as claimed in claim 4, arranged to communicate with an enforcement device and provide tampering events from the event log to the enforcement device.

6. The license plate tamper detection system as claimed in claim 4, arranged to communicate with an automatic interrogation system and provide vehicle registration information to the automatic interrogation system.

7. The license plate tamper detection system as claimed in claim 4, wherein the communications system is arranged to implement dedicated short-range communications.

8. The license plate tamper detection system as claimed in claim 4, wherein the communications system is arranged to implement encrypted communications.

9. The license plate tamper detection system as claimed in claim 1, further comprising a microcontroller.

10. The license plate tamper detection system as claimed in claim 1, further comprising an internal battery.

11. The license plate tamper detection system as claimed in claim 1, wherein said sensors, sensor units or license plates are arranged to communicate with each other using encrypted communications.

12. The license plate tamper detection system as claimed in claim 8, further comprising an encryption module.

13. The license plate tamper detection system as claimed in claim 1 arranged to assess whether the vehicle is stationary and to disable the sensors when the vehicle is not stationary.

14. The license plate tamper detection system as claimed in claim 1, wherein the first and second sensors comprise accelerometers.

15. A license plate tamper detection system for installation on a vehicle, the system comprising:
    a first sensor for providing monitor data corresponding to presence of a first license plate when installed on said vehicle; and
    a second sensor for providing reference data when installed on said vehicle,
    wherein the license plate tamper detection system is arranged to compare said monitor data with said reference data and generate a tampering event when there is more than a predetermined difference between the monitor data and the reference data, and
    wherein the license plate tamper detection system is arranged to assess whether the vehicle is stationary and to disable the sensors when the vehicle is not stationary.

16. A license plate tamper detection system for installation on a vehicle, the system comprising:
    a first sensor for providing monitor data corresponding to presence of a first license plate when installed on said vehicle; and
    a second sensor for providing reference data when installed on said vehicle,
    wherein the license plate tamper detection system is arranged to compare said monitor data with said reference data and generate a tampering event when there is more than a predetermined difference between the monitor data and the reference data, and
    wherein the first and second sensors comprise accelerometers.

* * * * *